United States Patent [19]

Ries

[11] Patent Number: 5,316,088
[45] Date of Patent: May 31, 1994

[54] ROTARY HOE MOUNTING UNIT FOR ROW CROP CULTIVATOR

[76] Inventor: Robert H. Ries, 14134 Liberty Union Rd., Ohio City, Ohio 45874

[21] Appl. No.: 830,614

[22] Filed: Feb. 4, 1992

[51] Int. Cl.⁵ ............................................ A01B 17/00
[52] U.S. Cl. ................................ 172/510; 172/551; 172/513; 172/156; 172/182
[58] Field of Search ............... 172/551, 142, 155, 156, 172/182, 508–510, 513

[56] References Cited

U.S. PATENT DOCUMENTS

| | | |
|---|---|---|
| 172,707 | 4/1887 | Nishwitz. |
| 801,961 | 10/1905 | Balmer .................. 172/510 |
| 1,376,910 | 5/1921 | Wright .................. 172/510 |
| 1,377,115 | 5/1921 | Clayton .................. 172/510 |
| 1,630,415 | 5/1927 | Blume et al. .................. 172/510 |
| 2,582,503 | 1/1952 | Oehler .................. 97/56 |
| 2,689,511 | 9/1954 | Begeman et al. .................. 172/551 |
| 3,804,179 | 4/1974 | Johnson .................. 172/510 |
| 4,121,669 | 10/1978 | Sosalla .................. 172/181 |
| 4,250,970 | 2/1981 | Pfenninger .................. 172/142 |
| 4,425,972 | 1/1984 | Steinberg .................. 172/551 |
| 4,428,437 | 1/1984 | Steinberg .................. 172/551 |
| 4,452,315 | 6/1984 | Swanson .................. 172/29 |
| 4,466,492 | 8/1984 | Steinberg .................. 172/551 |
| 4,485,878 | 12/1984 | Uken .................. 172/510 |
| 4,591,002 | 5/1986 | Meinert .................. 172/510 |
| 4,622,906 | 11/1986 | Melgoza .................. 172/551 |
| 5,133,414 | 7/1992 | Youngkrantz .................. 172/508 |

OTHER PUBLICATIONS

"The Renaissance of Rotary Hoes", By: Charlene Finck, Farm Journal, May 1990.
Yetter Tool Bar Rotary Hoe from pp. 6–7 of Yetter Mfg. Co. catalog (date unknown, admitted prior art).
May-Wes Speedshields ad from "Successful Farming", Aug., 1990.

Primary Examiner—Randolph A. Reese
Assistant Examiner—Spencer Warnick
Attorney, Agent, or Firm—Baker & Daniels

[57] ABSTRACT

The present invention is a mounting device for individually mounting rotary hoes on the shanks of row crop cultivators. The tractor pulls shanks through the fields to cultivate the soil with rotary hoes connected to the shanks by a mounting device. The mounting device includes a portion which clamps to the shanks and a portion which is pivotally connected to the clamping portion and extends to a rotatably mounted rotary hoe. The hoe may float over irregular surfaces of the ground to penetrate and dig up the soil. The rotary hoes may be biased by a spring to maintain a relatively constant ground depth, and they may include stops to limit their forward movement, backward movement, or both.

17 Claims, 2 Drawing Sheets

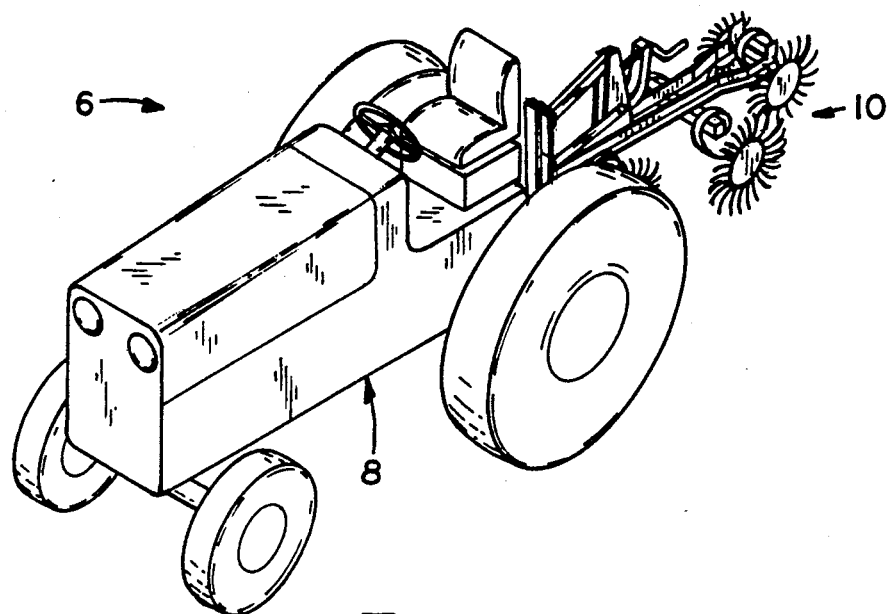
FIG_1
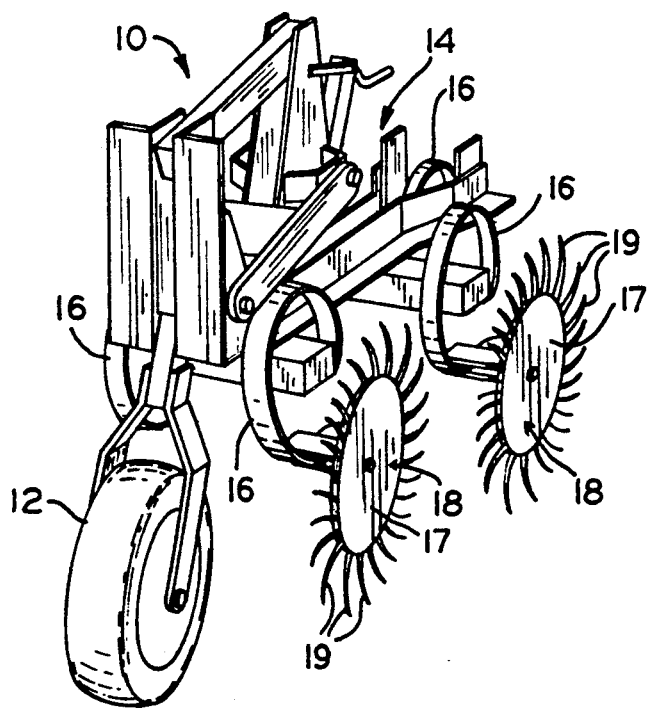
FIG_2

ROTARY HOE MOUNTING UNIT FOR ROW CROP CULTIVATOR

BACKGROUND OF THE INVENTION

1. Field of the Invention

The present invention relates to row crop cultivators. More specifically, the field of the invention is that of devices for mounting rotary hoes on the shanks of row crop cultivators.

2. Prior Art

As technology advances, agricultural equipment has become more complicated. Consequentially, such equipment is more specialized, requires more attention during operation, and is more expensive. However, the rotary hoe is relatively inexpensive, is easily operated, and may be adapted to perform many farming tasks. Conventionally, rotary hoes include a spoked wheel with each of the spokes having a blade-like projection extending beyond the circumference of the wheel. The projection has a shape well adapted to penetrate the ground, either to dislodge soil and throw the soil out of the path of the wheel or simply to create a hole. The depth at which the hoe penetrates the ground is determined by the length of the projection and any bias which may be applied, such as a static bias in the form of a weight on the hoe or a dynamic bias in the form of a resilient spring applied to the hoe.

Rotary hoes have flexibility for performing a variety of farming tasks, including weed control, chemical incorporation, crop emergence, soil aeration, and soil mulching. For weed control and chemical incorporation, the rotary hoe may be used to enhance chemical herbicides by mechanical incorporation before respraying, or to avoid such herbicides by flushing out seeds of weed plants. For crop emergence or soil aeration, the rotary hoe may be drawn directly over the ground to penetrate the top layer. For soil mulching, the rotary hoe may be drawn over the soil to both penetrate and dislodge soil. By adjusting the height and the bias applied to the rotary hoe, the same hoe may be used for each of these tasks.

Rotary hoes are used in combination with row crop cultivators to achieve those various tasks. Conventional row crop cultivators include a tractor connected to a tool bar which is connected to soil agitating devices, such as discs, shanks, or rotary hoes. Shanks are conventionally connected directly to the tool bar or to a gang assembly having a plurality of shanks, the gang assemblies being attached to the tool bar. Rotary hoes are conventionally connected to the tool bar by an arm, or alternatively hoes may be attached to the frame of a gang assembly. The supporting arm, and other parts used to mount the rotary hoe, must be structurally strong and securely fastened to the row crop cultivator to withstand the normal use of the hoe. The tractor pulls the tool bar and any attached gang assemblies through the soil, with the hoe wheels rolling over the top of the ground and their projections penetrating and agitating the ground.

Although many benefits are realized using conventional rotary hoe arrangements, some disadvantages exist with such arrangements. One disadvantage involves compensating for varying terrain, wherein irregular surfaces prevent one or more of the rotary hoes from touching the ground or from penetrating to the desired depth. Further, mountings for rotary hoes on tool bars do not allow for closely laterally spacing the hoes. Hoes which are attached to the frame of the gang assembly are often difficult to attach to the frame, and have relatively extensive connections which may interfere with the operation of the row crop cultivator. Also, conventional methods of mounting rotary hoes on tool bars and gang assemblies are relatively expensive, especially considering the relatively low cost of the rotary hoes themselves.

What is needed is a mounting device for individually mounting and removing rotary hoes.

Also needed is a mounting device which is adaptable to any type shank.

A further need is for such a mounting device which provides a spring bias on the hoe.

SUMMARY OF THE INVENTION

The present invention is a mounting device for rotary hoes which attaches directly to the shank of a row crop cultivator. The base of the mounting device clamps at any position on the shank, and is pivotally attached to an arm that rotatably supports the rotary hoe. The attachment of the arm on the shank allows the hoe to float over the surface of the ground independently of other hoes mounted on the row crop cultivator.

Individual mounting of rotary hoes at any position on the shank allows for tailoring the mounting arrangement to each particular task. Each mounting arrangement can be tailored to perform a specific task for a specific crop, while all the arrangements use conventional gang assemblies and conventional rotary hoes. Further, by allowing each hoe to float over the ground surface, irregular surfaces may be uniformly cultivated. In addition, the biasing of the rotary hoes may be adjusted according to the desired task.

Further, by mounting the rotary hoes on the shank, the tillage by the shank may be counteracted by the rotary hoe. A shank tends to cut through the ground and form undesirable ridges adjacent to its cutting path. With the mounting device of the present invention, the hoe immediately attacks the ridges as they are being formed. Thus, the mounting position of the hoe allows it to float over the ground surface and more evenly distribute the tilled dirt.

The mounting device is simple to attach, and may be attached at any position on a straight, C-shaped, or S-shaped shank. By simply positioning two plates of the mounting device on opposite sides of the shank, bolts or other fasteners may be used to securely attach the hoe. By loosening the fasteners, the mounting device may be slid to any position on the shank. An arm is pivotally attached to one of the plates and may pivot throughout an arc, which may be limited by stops provided on the plate. For large crops which do not require a hoe at the nearest shank position, the mounting device may be easily removed.

The present invention is, in one form, a row crop cultivator comprising a tractor, shanks connected to the tractor, and a rotary hoe. The rotary hoe includes a wheel and a plurality of projections radially extending from the wheel and being adapted to penetrate and agitate the ground. The rotary hoe is pivotally attached to one of the shanks by an attachment which is adjustably mounted on the shank. With this arrangement, the rotary hoe floats over the surface of the ground being cultivated. Also, the rotary hoe may be spring biased against the ground, or additional weight may be added to bias the hoe into the ground.

One object of the present invention is to provide a mounting device for individually mounting and removing rotary hoes.

Another object is to provide a mounting device which is adaptable to any type shank.

A further object is to provide a mounting device which provides a spring bias on the hoe.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a perspective view of a tractor and gang assembly having the rotary hoe mounting devices of the present invention.

FIG. 2 is a front perspective view of a gang assembly with rotary hoes mounted on it.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 3:
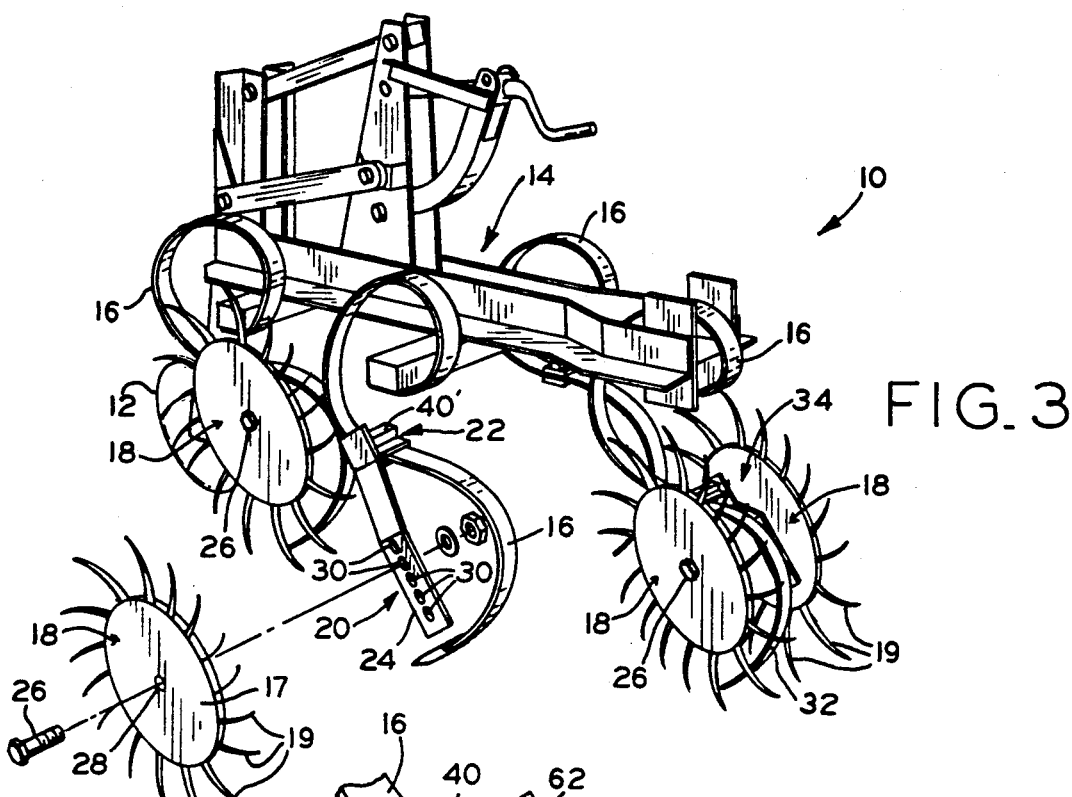
FIG. 3 is a rear perspective view of a gang assembly showing an exploded view of the mounting of the rotary hoe.

The present invention relates to row crop cultivators, one example being shown in FIG. 1. Row crop cultivator 6 includes tractor 8 which pulls gang assembly 10 over the ground to agitate the soil. As depicted in FIG. 2, gang assembly 10 is of conventional design, having guide wheel 12 positioned on the forward portion of frame assembly 14 which supports a plurality of shanks 16. Rotary hoes 18 are attached to gang assembly 10 so that as tractor 8 drives across the ground, hoes 18 engage and disturb the soil to accomplish the desired task, such as weed control, chemical incorporation, crop emergence, soil aeration, or soil mulching. Hoes 18 are of conventional construction, and include wheel 17 and projections 19 which are adapted to penetrate and agitate the ground.

In accordance with the present invention, rotary hoe mount 20 pivotally attaches rotary hoe 18 to shank 16. Referring to FIG. 3, clamp portion 22 attaches to shank 16 and pivotally receives arm 24. Bolt 26 extends through hub 28 of rotary hoe 18 and further through one of holes 30 in arm 24 to rotatably support hoe 18. The height of hoe 18 is selected by both the position of clamp portion 22 on shank 16 and by which one of holes 30 that bolt 26 extends through. By this arrangement, each hoe 18 is independently mounted on one of shanks 16. In the case of rear shank 32, dual rotary hoe mount 34 pivotally receives two arms 24, one extending from each side of dual mount 34, so that the corresponding rotary hoes 18 on dual mount 34 may independently pivot.

Each hoe 18 is slightly offset on one side from the position of its corresponding shank 16, thereby allowing hoes 18 to be spaced apart and in a pattern similar to how the ends of shanks 16 are arranged. For larger crops, hoe 18 which is disposed nearest the row of crops (not shown) may be removed. A variety of arrangements of hoes 18 are possible using rotary hoe mount 20.

Rotary hoes 18 may be mounted on shanks 16 so that tillage by any shank 16 may be counteracted by a corresponding rotary hoe 18. Each shank 16, when being dragged through the ground tends to form undesirable ridges adjacent to its cutting path. With rotary hoe mount 20, hoe 18 may be positioned so that its projections 19 immediately attack the ridges as they are being formed. Thus, the impingement of projections 19 on the ridges more evenly distributes the tilled dirt.

Although the ends of shanks 16 are shown to be at about the same vertical position as the bottoms of hoes 18, conventional gang assemblies 14 include mechanisms which may keep the shank ends well above the level of the ground. When gang assembly 14 is so disposed above ground level, hoes 18 may be arranged to extend from raised shanks 16 and agitate the ground independently of the shanks. Also, each hoe 18 is disposed at a height which is independent of the height of the other hoes 18 so that each hoe 18 floats over the surface of the ground. Also, the height of hoes 18 may be adjusted so that some of the hoes 18 penetrate deep within the ground, while other hoes 18 may be adjusted to pass lightly over the top of the ground to serve as a fender beside the row of crops.

Figure 4:
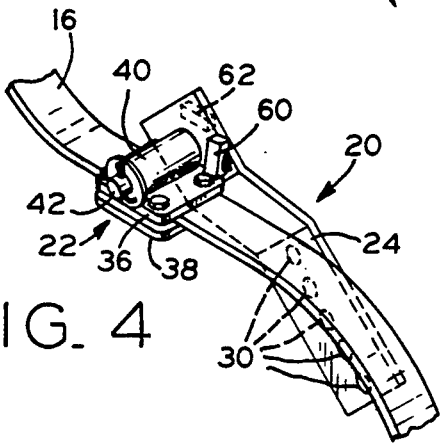
FIG. 4 is perspective view of the mounting device of the present invention attached to a shank.
Figure 5:
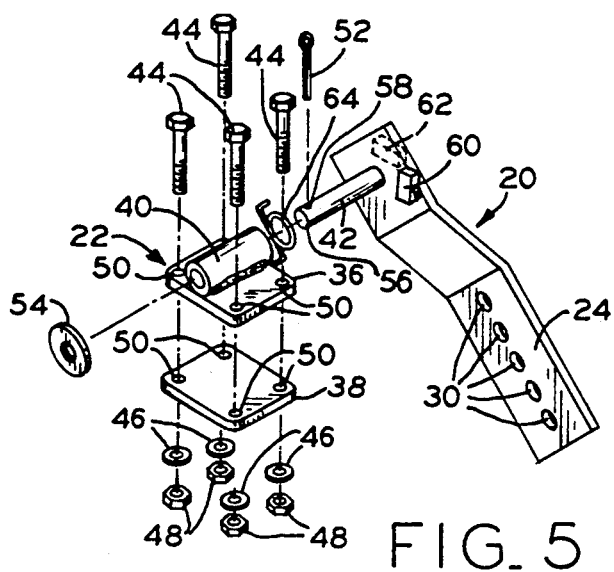
FIG. 5 is an exploded view of the mounting device.

FIGS. 4 and 5 show the structure of mount 20. Clamp portion 22 includes top plate 36 and bottom plate 38, with top plate 36 including bushing 40 for pivotally receiving pivot shaft 42 of arm 24. Plates 36 and 38 are connected about shank 16 by means of bolts 44, washers 46, and nuts 48 so that plates 36 and 38 vertically trap shank 16 when nuts 48 are tightened on bolts 44. Mounting holes 50 in plates 36 and 38 are spaced apart by approximately the width of shank 16 so that bolts 44 extend through mounting holes 50 and laterally trap shank 16. Further, mount 20, may be repositioned on shank 16 by loosening bolts 44, sliding mount 20 to the desired position, and tightening bolts 44. Alternatively, mount 20 may be removed from shank 16 by disengaging bolts 44 from nuts 48 and moving plates 36 and 38 from shank 16.

Pivot shaft 42 is disposed within bushing 40 which pivotally supports arm 24. Pivot shaft 42 is secured to clamp portion 22 by means of pin 52 and washer 54. End 56 of pivot shaft 42 protrudes out of bushing 40 and is received by washer 54, with end 56 including bore 58 which receives pin 52 and thereby secures the axial position of pivot shaft 42. Arm 24 may also include down stop 60 which limits the range or arc of pivoting by down stop 60 abutting top plate 36 and preventing further pivoting of arm 24. By properly positioning clamp portion 22 on shank 16, the depth at which hoe 18 penetrates the ground may be limited.

Additionally, arm 24 may further include up stop 62 which limits the range of pivoting by up stop 62 abutting top plate 36 and preventing further pivoting of arm 24. Up stop 62 is particularly useful when mount 20 is attached to a gang assembly 10 which is to be transported. Conventionally, gang assemblies 10, at least those which are disposed at the end of a tool bar (not shown), are pivoted upward for transportation. When upwardly disposed, arm 16 tends to pivot in an opposite direction because the orientation of mount 20 relative to the earth has been juxtaposed.

In accordance with the present invention, spring 64 engages bottom plate 38 and arm 24 to bias rotary hoe 18 into the ground. Alternatively, a passive bias such as additional weight on arm 24 may be used to bias the angular position of arm 24 and therefore determine the position of rotary hoe 18 in relation to the ground. Biasing rotary hoe 18 into the ground further enhances the ability of hoe 18 to float over the ground by providing the projections of hoe 18 to penetrate the ground with greater force, thereby improving its penetration and its ability to break up the soil.

Although mount 20 is shown attached to S-shaped shanks 16, straight or C-shaped shanks could be used without impediment to the functionality of mount 20. Also, although mount 20 is shown in detail in FIGS. 4 and 5 as extending from the right side of the shank, mounts with arms extending from the left of the shank may be assembled by using a mirror image of the arm, see FIG. 3. Alternatively, mounts with two arms extending from both sides of the shank may be assembled by two pivot shafts sharing the same bushing (such as with dual rotary hoe mount 34). Clamp portion 22 may have cylindrically shaped bushing 40 which receives pivot shaft 42 as shown in FIGS. 4 and 5, or alternatively may have bushing 40′ having a rectangular or square shaped cross-section as shown in FIG. 3. In the preferred embodiment, arm 24 has five holes 30 extending length-wise across arm 24.

Rotary hoes 18 have been described in a general sense because rotary hoes are well known and the actual structure of the hoe is not crucial for proper understanding of the present invention. In the preferred embodiment, the specific type of rotary hoe used is Part Number 3400-111-G made by Yetter Manufacturing Company, located in Colchester, Ill. 62326-0358. Further, the present invention is compatible with a great many rotary hoes currently available.

In addition to mounting rotary hoes, the mounting device of the present invention may be used to mount other farm implements on ground working tools. For example, on a row of shanks working the ground, the mounting device could rotatably support a shield on an outermost shank to prevent soil from being tossed into untilled areas. Therefore, the present invention is adaptable to a variety of uses.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A row crop cultivator adapted to be pulled by a tractor, said row crop cultivator comprising:
   a plurality of closely spaced shanks arranged as a row unit operably connected to the tractor;
   a rotary hoe including a wheel and a plurality of projections radially extending from said wheel, said projections adapted to penetrate and agitate the ground; and
   means for attaching said rotary hoe between any two adjacent ones of said shanks, said attaching means including mounting means for adjustably mounting said attaching means on any portion of one of said adjacent shanks, said mounting means also including a plate having means for pivotally supporting said rotary hoe, said attaching means including an arm which positions said rotary hoe adjacent one of said shanks such that the arm pivots in an arc so that said projections of said rotary hoe impinge the soil as the soil is tilled by said shanks, said arm associated with said plate and including a stop block mounted on said arm which limits the pivoting arc of said arm by abutting said plate, whereby said rotary hoe independently floats over the surface of the ground being cultivated.

2. The row crop cultivator of claim 1 wherein said arm is removably connected to said mounting means whereby said rotary hoe may be disconnected from said shank without removing said mounting means.

3. The row crop cultivator of claim 1 wherein said mounting means includes a second plate and means for connecting said plates to said shank, said connecting means adapted to allow said mounting means to slide over said shank.

4. The row crop cultivator of claim 1 further comprising means for biasing said supporting means whereby said rotary hoe is biased into the ground.

5. The row crop cultivator of claim 1 wherein said mounting means includes a cylindrical bushing which receives said arm of said attaching means.

6. The row crop cultivator of claim 1 wherein said mounting means includes a bushing having a square shaped cross-section which receives said arm of said attaching means.

7. A row crop cultivator adapted to be pulled by a tractor, said row crop cultivator comprising:
   a plurality of closely spaced shanks arranged as a row unit operably connected to the tractor;
   a rotary hoe including a wheel and a plurality of projections radially extending from said wheel, said projections adapted to penetrate and agitate the ground; and
   means for attaching and rotatably supporting said rotary hoe between any two adjacent ones of said shanks, said attaching means adjustably mounted on one of said adjacent shanks, said attaching means pivotally positioning said rotary hoe relative to said one shank so that said rotary hoe floats over the surface of the ground being cultivated, said attaching means including a bushing and means for clamping said bushing at any position on the shank, said attaching means further including an arm for connecting said bushing to said rotary hoe, said arm including a pivot shaft disposed in said bushing, said attaching means including a spring disposed around said pivot shaft and biasing said rotary hoe relative to said one shank and against the ground.

8. The row crop cultivator of claim 7 wherein said attaching means extends to one side of said shank so that said rotary hoe may pivot to any position.

9. The row crop cultivator of claim 7 wherein said attaching means extends to one side of said shank and includes a stop portion which limits the pivoting arc of said rotary hoe.

10. The row crop cultivator of claim 7 wherein said rotary hoe may be disconnected from said shank without removing said attaching means.

11. The row crop cultivator of claim 7 wherein said attaching means includes two plates and means for connecting said plates to said shank, said connecting means adapted to allow said mounting means to slide over said shank.

12. The row crop cultivator of claim 7 wherein said attaching means includes a cylindrical bushing which receives said supporting means of said attaching means.

13. The row crop cultivator of claim 7 wherein said attaching means includes a bushing having a square shaped cross-section which receives said supporting means of said attaching means.

14. A cultivator for tillage of soil in preparation for planting rows of crops, said cultivator adapted to be pulled by a tractor, said cultivator comprising:
- a plurality of closely spaced shanks arranged for deep soil tillage, said plurality of shanks arranged such that at least two of said shanks are positioned between a crop row, said plurality of shanks being operably connected to the tractor;
- a rotary hoe including a wheel and a plurality of projections radially extending from said wheel, said projections adapted to penetrate and agitate the ground; and
- means for attaching said rotary hoe to any one of said plurality of shanks, said attaching means including mounting means for adjustably clamping said attaching means on one of a plurality of portions of said one shank, said mounting means including a first plate with a hollow portion defining a bushing, a second plate, and means for clamping said first and second plate at any position on the shank, said attaching means also including means for rotatably supporting said rotary hoe, said rotatably supporting means including an arm for connecting said mounting means to said rotary hoe, said arm including a pivot shaft disposed in said bushing, said arm extending from one side of said one shank and being pivotally connected to said mounting means, said attaching means positioning said rotary hoe adjacent one of said shanks so that said projections of said rotary hoe impinges the soil as the soil is tilled by said shanks whereby said rotary hoe independently floats over the surface of the ground being cultivated.

15. The cultivator of claim 14 wherein said arm includes a stop portion which limits the pivoting arc of said rotary hoe.

16. The cultivator of claim 14 wherein said arm is removably connected to said mounting means whereby said rotary hoe may be disconnected from said one shank without removing said mounting means.

17. The cultivator of claim 14 further comprising means for biasing said arm whereby said rotary hoe is biased into the ground.

* * * * *